Sept. 30, 1941.                B. STREZOFF                2,257,354
                        CLAMP AND BRACKET STRUCTURE
                        Filed Aug. 8, 1940          2 Sheets-Sheet 1
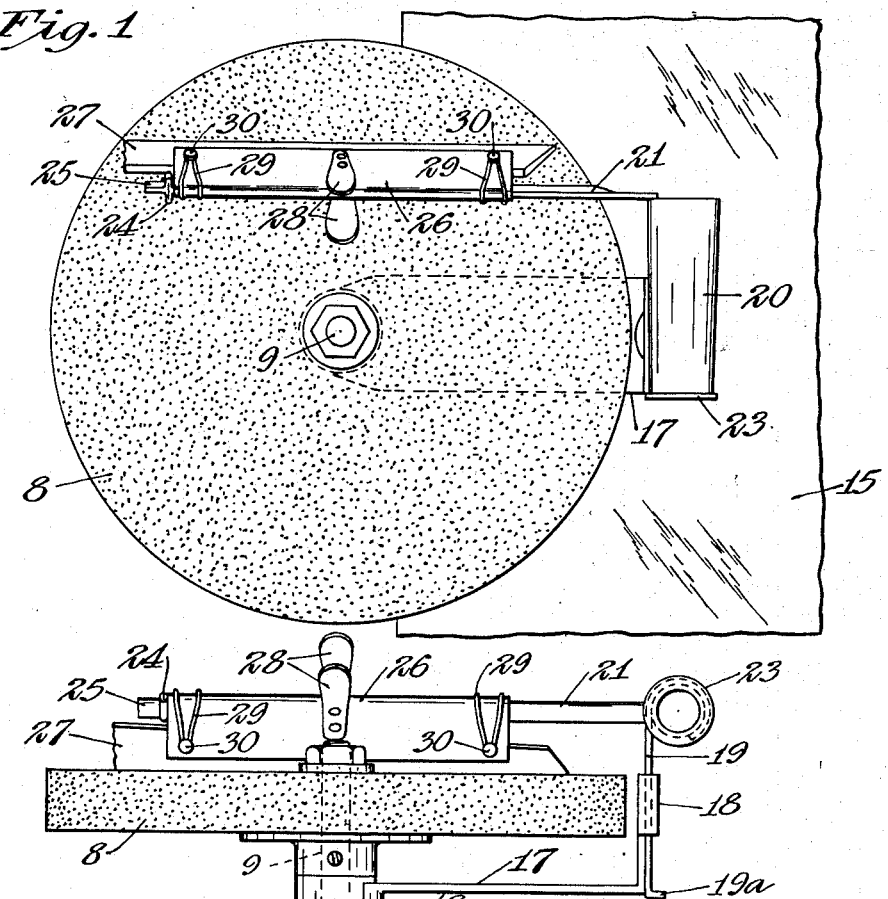
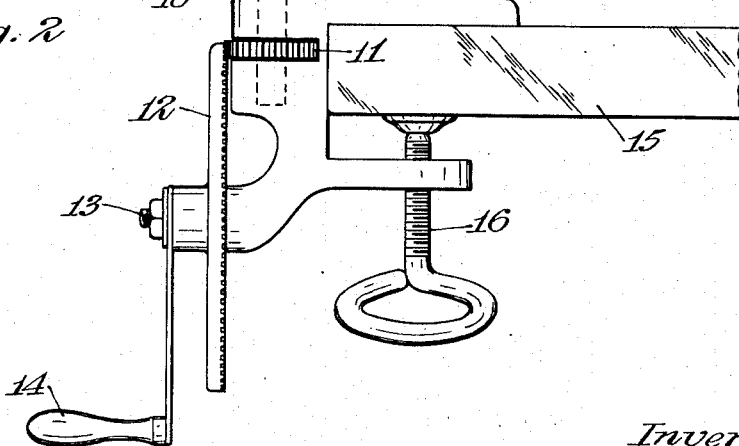
Inventor
Bogoia Strezoff
By Williamson & Williamson
Attorneys Sept. 30, 1941.  B. STREZOFF  2,257,354
CLAMP AND BRACKET STRUCTURE
Filed Aug. 8, 1940  2 Sheets-Sheet 2
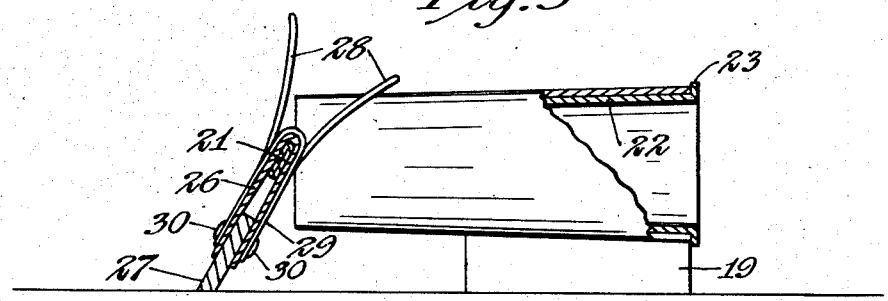
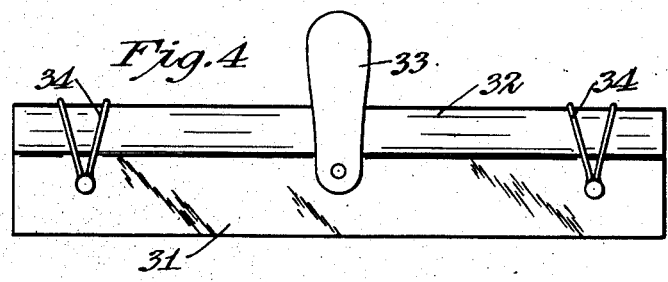
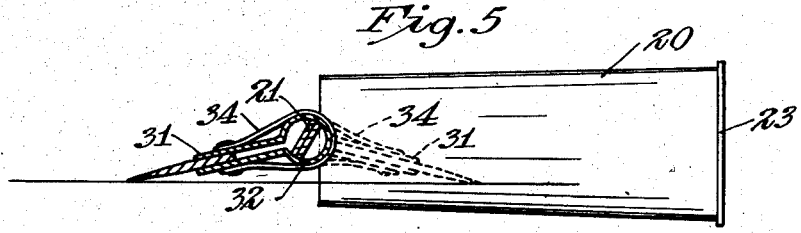
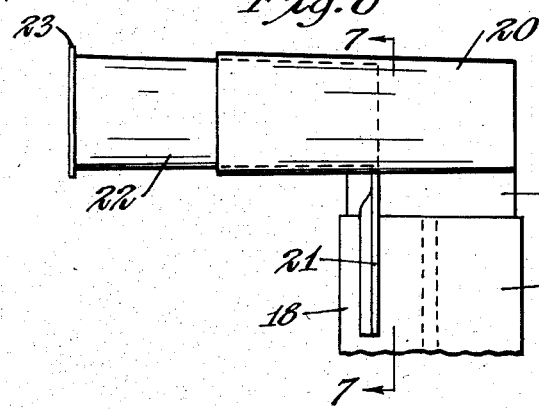
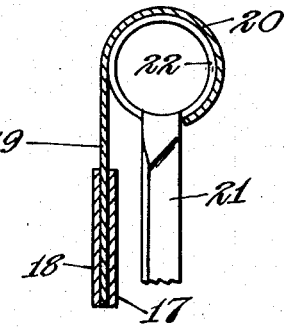
Inventor
Bogoia Strezoff
By Williamson & Williamson
Attorneys Patented Sept. 30, 1941

2,257,354

UNITED STATES PATENT OFFICE 2,257,354

CLAMP AND BRACKET STRUCTURE

Bogola Strezoff, Minneapolis, Minn.

Application August 8, 1940, Serial No. 351,880

4 Claims. (Cl. 51—125)

This invention relates to sharpening devices and is particularly adapted for sharpening cutting devices such as shears and knives.

It is an object of my invention to provide means for supporting and grinding cutting instruments such as shears, hair clipper blades, and knives in such a manner that the shears blades will be supported at the proper angle for grinding the bevelled cutting edge and wherein means is also provided for supporting thin edged blades, such as on knives, in a different angular position from the shears blade and wherein the knife blade holding means can be manipulated to grind or sharpen both sides of the knife blade.

Another object of the invention is to provide a bracket including an arm supporting the work clamp wherein the arm is easily detachable from the remainder of the bracket and further wherein the arm can be quickly attached to the bracket in such manner that it can be swung relative to the bracket.

A further object of the invention is to provide work supporting means which can be moved toward or away from the grinding means to accommodate the device to different types of grinding operations.

These and other objects and advantages of the invention will more fully appear from the following description made in connection with the accompanying drawings, wherein like reference characters refer to the same parts throughout the views, and, in which:

Fig. 1 is a plan view of my invention with a shears clamp incorporated therewith;

Fig. 2 is an elevation thereof;

Fig. 3 is an enlarged detail of the work holding means in section and a portion of the bracket broken away to show interior construction;

Fig. 4 is a side elevation of the knife blade clamp;

Fig. 5 is an enlarged detail similar to Fig. 3 showing the alternate positions of the knife blade clamp;

Fig. 6 is an enlarged fragmentary detail illustrating the method of associating the clamp supporting arm with the main bracket; and Fig. 7 is a section taken approximately on the line 7—7 of Fig. 6.

In Figs. 1 and 2 there is shown a rotary grinding wheel 8 which has a flat upper surface and which has a supporting shaft 9 rotatably mounted in a suitable casting 10 and connected by gears 11 and 12 to a shaft 13 which may be rotated by a hand crank 14 or by other suitable means. The casting 10 may be secured to a shelf or table 15 by means of a screw clamp indicated generally at 16.

A bracket 17 has an end portion 18 which may be connected to the casting 10 by welding or other suitable means, and said bracket 17 extends outwardly beneath the grinding wheel 8 and thence upwardly adjacent its edge terminating adjacent the upper face of said grinding wheel 8. The upwardly extending end of the bracket 17 is provided with a pair of wings 18 which are bent over toward each other and in spaced relation to the end portion of the bracket to provide a loop or guide for a cooperating bracket portion 19 which extends through a loop provided by the wings 18, and the lower end of the bracket portion 19 is bent over as at 20 to provide a stop for limiting the forward sliding movement of said bracket portion with respect to the wings 18.

The upper portion of bracket member 19 is provided with a roll 20, and, as best shown in Figs. 2 and 7, this roll portion terminates some distance from the bracket 19 so that the roll portion 20 is in fact a generally cylindrical member having a longitudinal slot from end to end. It is preferred that the rolled portion 20 not be truly cylindrical, however, but that it have a slight frusto-conical shape for reasons to be explained.

A work clamp supporting arm 21 is provided with an inner end portion comprising a generally cylindrical but preferably frusto-conical member 22, and it will be seen that the member 22 is connected to the arm 21 at its smaller end. The outer or larger end may be provided with a suitable stop member such as a flange 23. When the arm 21 is held in a vertical position the frusto-conical member 22 can be slipped into the rolled bracket portion 20 and arm 21 will pass through the slot provided in said rolled bracket portion. This is best brought out in Figs. 6 and 7. When the arm 21 has been passed completely through the slot 20, the flange 23 will engage the left-hand end of the rolled portion as viewed in Fig. 6, and arm 21 will lie just beyond the right-hand end of said rolled portion 20 so that the arm can be swung from the position shown in Figs. 6 and 7 upwardly and over the grinding stone 8 to a position such as illustrated in Fig. 2. Thereupon the arm 21 and its frusto-conical end 22 cannot be accidentally disengaged from the rolled portion 20 of the bracket 19 although free pivotal movement is provided. The rolled portion 20 and member 22 on the arm 21 are preferably frusto-conical in shape so that when the two members are inter-engaged they will fit relatively closely, but at the same time will permit pivotal movement of the arm 21.

The outer end of arm 21 is free and unconnected with the bracket or any other supporting member so that the arm can be swung upwardly when desired, and adjacent the outer end is a stop member 24 and said arm 21 is extended beyond the stop member to provide a relatively short arm manipulating handle portion 25.

As best shown in Figs. 1, 3 and 5 the arm 21 is tilted on its longitudinal axis and this tilt is provided to give the proper angular position to a work holding clamp such as the shears blade clamp 26. This clamp comprises a piece of spring metal bent upon itself, and, as best shown in Fig. 3, is so formed that it relatively tightly grips the arm 21 and along its lower edges is adapted to removably but securely engage a shears blade 27. Because of the tilt of the arm 21 on its longitudinal axis and the gripping action of the clamp 26 on said arm the shears blade will be held at a definite angle with respect to the grinding stone. Clamp 26 is provided with a pair of finger engaging wings 28 to assist in opening the clamp when releasing the work and removing said clamp from its supporting arm 21. To supplement the gripping action of clamp 26 I provide a pair of looped spring members 29 which lie over the clamp 26 adjacent its ends, and the ends of the looped springs are secured to the clamp as by welding at 30.

In Figs. 4 and 5 there is shown a knife blade clamp 31 formed of a piece of spring metal bent upon itself and wherein the cooperating jaws of the clamp are normally urged toward each other and are substantially parallel from their lower edges to a point adjacent their common upper edge. This upper edge is in the form of substantially cylindrical roll 32 and said cylindrical portion is of such size that it will fit around the arm 21 relatively closely yet at the same time permit oscillation of the clamp on the arm 21. This oscillatory movement is best indicated by the full line and dotted line position in Fig. 5. The knife clamp 31 is provided with finger engaging wings 33 similar to the wings 28 in the above described clamp, and said clamp 31 is also provided with reenforcing springs 34 which are positioned on and welded to the clamp in the same manner as the springs 29 on the clamp 26.

From the foregoing description it will be seen that I have produced a sharpening or grinding unit with a work supporting bracket structure which will permit quick detachment of the arm 21 from the remainder of the bracket without having to provide for removable nuts and bolts and the like. At the same time the arm 21 can be freely swung with respect to its supporting bracket structure and can be easily removed so that other types of arms can be substituted for the arm 21. In addition I provide work supporting clamps which in combination with the arm 21 can be utilized to hold a blade such as a shears blade in a definitely angular position relative to the working face of the grinding disc, or with the knife blade type of clamp, which can be easily substituted for the shears clamp, a knife can be gripped in such a manner that the clamp can be oscillated to grind both sides of the blade. The vertical movement of the bracket member 19 relative to the bracket member 17 permits variation of the distance of the arm 21 from the working face of the grinding element 8 to allow for the difference in angular position between the more nearly erect shears blade and the more nearly flat knife blade, the latter being illustrated in Fig. 5.

It will, of course, be understood that various changes may be made in the form, details, arrangement and proportions of the various parts without departing from the scope of my invention.

What is claimed is:

1. In a sharpener, a rotary sharpening element having a flat sharpening surface, a clamp bracket having an arm extending across the face of said sharpening element in spaced relation thereto, said bracket including a partially rolled portion having an edge spaced from the remainder of said bracket to define a slot from end to end at a point spaced from said arm when said arm is extended over said sharpening element parallel to said element, and said arm having a substantially cylindrical portion slidably fitted in said rolled bracket portion, and said arm being detachable from said rolled bracket portion by axial sliding movement when said arm is positioned in alignment with said slot.

2. The structure in claim 1 and said arm being tilted at an angle to said sharpening surface, and a substantially V-shaped clamp removably fitted over said arm and closely gripping said arm to support said clamp at the tilted angle of the arm.

3. The structure in claim 1 and a work holding clamp bent upon itself and including the substantially tubular portion at its point of bend, the remainder of said clamp constituting closely spaced parallel faces, and said tubular portion fitting over said arm and being rotatable thereupon.

4. The structure in claim 1 and said arm having a lateral projection adjacent one end thereof, and said end being extended beyond said projection and constituting a manipulating handle, and clamp means removably positioned on said arm and also positioned inside of said stop means to prevent said clamp from slipping off said end of said arm.

BOGOIA STREZOFF.